United States Patent [19]
Baumann et al.

[11] 3,749,953
[45] July 31, 1973

[54] VENTILATED DYNAMOELECTRIC MACHINES

[75] Inventors: Frederick W. Baumann, Scotia; George M. Rosenberry, Jr., Elnora, both of N.Y.

[73] Assignee: General Electric Company, Schenectady, N.Y.

[22] Filed: Feb. 24, 1972

[21] Appl. No.: 228,891

[52] U.S. Cl. ................................................. 310/62
[51] Int. Cl. ............................................. H02k 9/06
[58] Field of Search ................... 310/62, 63, 58, 52, 310/85, 89

[56] References Cited
UNITED STATES PATENTS

| | | | |
|---|---|---|---|
| 2,615,937 | 10/1952 | Ludwig | 310/63 |
| 2,488,365 | 11/1949 | Abbott | 310/62 |
| 3,610,975 | 10/1971 | Onjanow | 310/63 |
| 2,716,195 | 8/1955 | Anderson | 310/63 |
| 2,778,958 | 1/1957 | Hamm | 310/63 |
| 2,783,398 | 2/1957 | Haas | 310/58 |
| 3,272,136 | 9/1966 | Franzen | 310/52 |

*Primary Examiner*—R. Skudy
*Attorney*—Vale P. Miles et al.

[57] ABSTRACT

A dripproof (open ventilation) dynamoelectric machine is improved by the addition of an auxiliary fan and fan enclosure of totally enclosed design to either or both ends of the basic dripproof machine. The fan and its associated enclosure direct at least a majority of the air passing into the fan enclosure through the adjacent dripproof end shield to the end turn cavity of the dynamoelectric machine for enchanced cooling of the stator winding end turns. After passing over the end turns, the air flow is exhausted by the end shield curvature axially along the outer periphery of the machine to flow between a plurality of cooling fins extending outwardly from the stator frame to further cool the machine.

3 Claims, 3 Drawing Figures

VENTILATED DYNAMOELECTRIC MACHINES

BACKGROUND OF THE INVENTION

The present invention relates to dynamoelectric machines, and more particularly to dynamoelectric machines having superior ventilation produced by the utilization of an auxiliary fan and fan enclosure on at least one end of a dripproof machine for increasing air flow through the adjacent end turn cavity of the machine.

Among the design problems related to dynamoelectric machines, none is more significant than the problem of generated heat, i.e., Joulean heating of machine windings combined with heat produced by hysteresis and eddy currents within magnetic members of the machine cause operating temperatures to increase as increased power is drawn from, or supplied to, the machine. Dissipation of the heat generated in this manner is required to prevent destruction of the electrical insulation of the machine and other undesirable phenomena which combine to reduce efficiency and cause failure. Thus, as attempts are made to increase the power input or output of such machines, a major concern becomes the manner and efficiency of dissipating the heat of operation.

In the past, dynamoelectric machines have been of alternative totally enclosed (containing a fixed quantity of circulating cooling fluid) or dripproof (that is, open to the external ambient atmosphere) designs. Air-cooled totally enclosed machines commonly combine means for circulating a fixed volume of fluid within the machine enclosure (for carrying heat from the heat generating elements to the frame and other external elements of the machine) with an external fan adapted to direct a flow of atmospheric air across the frame and/or end shields of the machine to transfer the heat therefrom into the atmosphere. Air-cooled dripproof machines, on the other hand, commonly incorporate a single internal fan, or a plurality of internal fans associated with the rotor element for drawing atmospheric air into the machine and into direct contact with the heat producing elements thereof to transfer heat by convection to the air before subsequently expelling the heated air back into the atmosphere. Prior art dripproof machines also have been provided with auxiliary fan elements disposed on at least one end of the machine to increase the flow of cooling air through the machine in cooperation with the internal fan elements.

Although most air cooled dripproof motor ventilation techniques pass the main air stream axially through the motor interior while totally enclosed motors pass the cooling air over the exterior of the motor frame, a number of "hybrid" designs, e.g., such as the design illustrated in Dunn, Jr. U.S. Pat. No. 3,383,530, have been proposed wherein a majority of the air is passed axially down the finned outer shell of the motor with a minor quantity of air also being bled into the end turn region through a selectively apertured partition to gently scrub the end turns. While such motor designs tend to reduce the abrasive effect of particulate material in the air stream upon the end turn insulation, air flow through the end turn region is limited. Similarly, other dripproof motors, e.g., in U.S. Pat. application Ser. No. 87,117, now a U.S. Pat. No. 3,643,119 filed in the name of A.F. Lukens, have been proposed wherein the entire cooling air stream is drawn through the end turn cavities of the machine before being axially exhausted along the finned outer surface of the machine frame. Because the rotor fans serve to draw the air into the machine, as well as exhaust the air along the frame, the volume of air passing through the motor is limited to a fan size determined by the end turn region (notwithstanding the use of curved fan blades at opposite ends of the rotor to enhance air flow). Although air flow through a machine can be enhanced by additional serial fans, such fans typically have necessitated expensive redesigns of existing machines and the maintenance of large inventories of unique parts.

The present invention brings relief to both of these problem areas, i.e., cooling of end turns and reducing attendant costs, by combining with a ventilation system for a dripproof motor (which emphasizes end turn cavity cooling) an inexpensive external auxiliary fan and fan enclosure adapted to direct a majority of the air moved thereby into the associated end turn cavity for maximum heat dissipation prior to exhaust of the air stream axially along the exterior of the finned stator frame. Furthermore, the auxiliary fan and casing of the present invention are adapted to be interchangeably used in combination with dripproof and totally enclosed machines without the requirement for the utilization of specialized fan and enclosure designs adapted solely for use on one or the other type machine.

It is therefore an object of the present invention to provide a dynamoelectric machine having a new and improved ventilation system.

It is a further object of the present invention to provide a dripproof dynamoelectric machine having a ventilation system which provides increased flow of cooling air into the end turn cavities.

It is still another object of the present invention to provide an auxiliary external fan and enclosure which are capable of being used in combination with presently available dripproof machines and totally enclosed machines without the requirement for a variation in the design of such fans and enclosures.

It is a further object of the present invention to provide a dripproof machine ventilation system incorporating a first rotor fan disposed inside the machine casing and a second fan disposed externally of the machine which together operate serially upon a given air flow through the machine.

SUMMARY OF THE INVENTION

In order to accomplish the foregoing (as well as further objects which will become apparent hereinafter), the present invention, in one embodiment thereof, utilizes a machine of the dripproof variety having a pair of opposed internal fan members associated with the machine rotor. The internal fans are located in end turn cavities between the machine's stator and end shield at axially opposite ends of the machine. Each internal fan is designed to pass cooling air through its associated end turn cavity from an entrance to a radially located exit before passing the air axially between fins protruding outwardly from the stator frame. To one or both ends of the machine, as described, is added an external fan driven by rotation of the rotor, and a fan enclosure having an air intake and exhaust adapted respectively to draw atmospheric air into the enclosure and direct at least a majority of the air into the associated end turn cavity through orifices in the machine end shield. The fan and enclosure are to be designed so as to be readily mounted upon dripproof machines as well as upon totally enclosed machines of the same frame size.

The present invention will be more particularly described hereinafter in conjunction with the drawings in which:

FIG. 1 is an axial section view of a motor incorporating the improved ventilation system of the present invention, FIG. 2 is an elevation of the fan cover, and FIG. 3 is an elevation of the motor end shields taken along lines 3—3 of FIG. 1.

DESCRIPTION OF A PREFERRED EMBODIMENT

Figure 1:
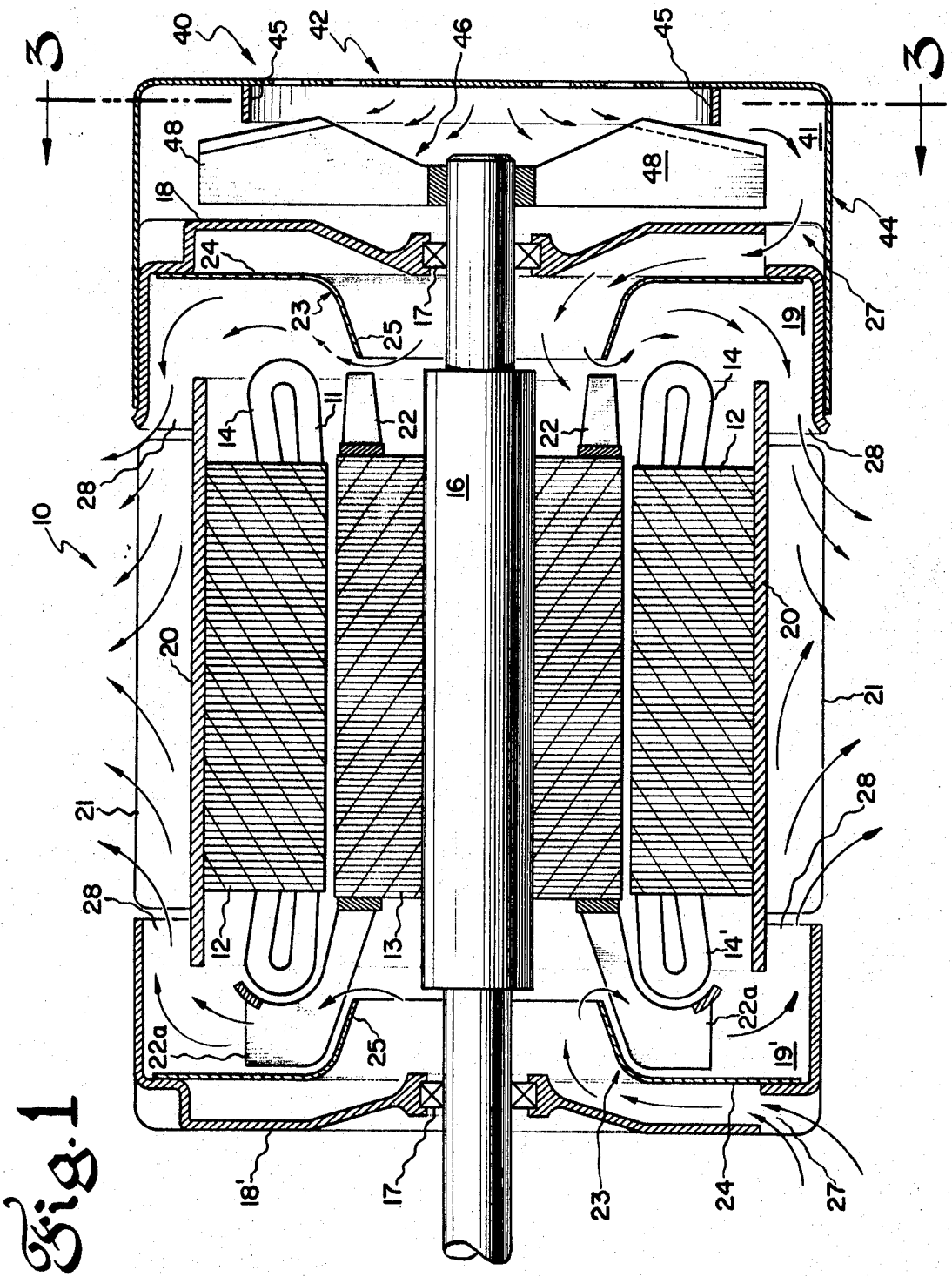

A dripproof induction motor 10 incorporating elements of the present invention, is depicted in FIG. 1 and generally includes an annular stator 12 circumferentially disposed about a cylindrical rotor 13 supported upon a rotatable shaft 16 mounted within bearings 17. Except for the motor ventilation, the motor is conventional in design with rotation of the squirrel cage rotor being effected by the magnetic fields generated by current flow through stator windings 11 extending axially through slots (not shown) formed along the radially inner surface of stator 12.

Enclosing the ends of the rotor and stator are a pair of end shields 18 and 18', which, together with the stator, form end turn cavities 19 and 19' enveloping end turns 14 and 14'. Circumferentialy surrounding the stator is a cylindrical frame 20 which carries a plurality of outwardly extending cooling fins 21. Part of the heat produced within the stator during the operation of the motor is conducted to fins 21 through frame 20 to be transferred by convection to air flowing axially between the fins. The foregoing basic motor structure is similar to the motor described in heretofore mentioned Lukens U.S. Pat. No. 3,643,119.

Having thus described the typical basic motor structure, the new and improved ventilation system of the present invention will now be described. As discussed above, a critical problem of motor (and other dynamoelectric machine) design has been means for cooling the end turns 14 during operation of the machine. Cooling fins 21 are adapted to carry off much of the heat generated by the stator, but the fins are incapable of cooling the end turns due to the position and orientation of the latter. Therefore, it is desirable to make provision for the passage of a large quantity of cooling air through the end turn cavities in such a way as to carry off the end turn heat by means of convection. While prior attempts at increasing air flow through the end turn cavity have met with limited success, the present invention incorporates elements for greatly increasing this flow thereby greatly enhancing cooling of the end turns. Although the ventilation system disclosed in FIG. 1 is particularly disclosed as applied to the dripproof motor arrangement, it is significant, i.e., from a parts design and inventory standpoint, that the added cooling elements of the present invention may be alternatively used for the cooling of totally enclosed motor configurations.

Assuming that the left-hand side of the motor illustrated in FIG. 1 is the drive end thereof, and the right-hand side is the opposite drive end, the ventilation system disclosed therein is arranged as follows. Referring first to the opposite drive end, a plurality of nominal rotor diameter fan blades 22 cast upon the end rings of rotor 13 serve to move air through the end turn cavity in the directions shown by the arrows. A baffle 23 disposed within the end turn cavity, and having an outwardly flaring periphery 24 and a truncated conical center section 25, is adapted to guide air into the radially central portion of the motor proximate shaft 16 (and fan blades 22) from a plurality of orifices 27 disposed along the bottom and sides of dripproof end shields 18 and 18'. An exhaust opening 28 is provided for passing the air from the end turn cavity 19 axially along the outer periphery of frame 20 and past cooling fins 21 into the atmosphere. To this extent, the flow of cooling air through the end turn cavities of the motor is similar to such applications in the prior art.

In departure from the prior art, at the opposite drive end of the motor is applied a particular fan enclosure 40 having multiperferate apertures, identified by reference numeral 42, for the admission of air to the fan space 41 defined between the fan enclosure 40 and end shield 18. The fan enclosure 40 includes a cylindrical wall 44 or other alternative baffle arrangement for guiding the air flowing out of the fan space into the associated end turn cavity 19 through orifices 27. Wall 44 also serves to join the fan enclosure 40 to the basic dripproof motor 10, and is designed to be applicable also to enclosed motors of the same frame size.

Upon an extended portion of rotor shaft 16 is mounted an auxiliary fan, illustrated as a radial fan 46 having a plurality of fan blades 48. The auxiliary fan is adapted to move very large quantities of air and, in combination with the fan enclosure, moves such quantities of air through fan space 41 into end turn cavity 19 through orifices 27. Due to the absence of clearance restrictions upon the size of the blades of fan 46 (which limitations do apply to fan blades 22), the auxiliary fan can be designed to move as much air as is desired into the associated end turn cavity for the purpose of cooling end turns 14. An annular plate 45 also is provided between the fan and fan enclosure to limit the back flow of air in the fan enclosure. It can thus be seen that the addition of this auxiliary fan produces a substantial enhancement of the cooling capacity of the dripproof motor.

Because no auxiliary fan normally is employed at the drive end of the motor, e.g., because of design limitations commonly associated with the drive end of a motor, the motor of the present embodiment of the invention preferably is characterized by enlarged rotor fan blades 22a which extend axially into end turn cavity 19' before sweeping radially outward to overlie the ends of end turns 14'. The curved rotor fan blades significantly enhance air flow in a radial direction (i.e., relative to the nominal rotor diameter fan blades 22 illustrated at the opposite drive end of the rotor) and preferably are utilized when design restrictions inhibit use of an auxiliary fan at the drive end of the motor. However, if such design restrictions do not apply in a particular situation, it would be possible to incorporate an auxiliary fan at the drive end of the motor in association with nominal diameter rotor blades.

Figure 2:
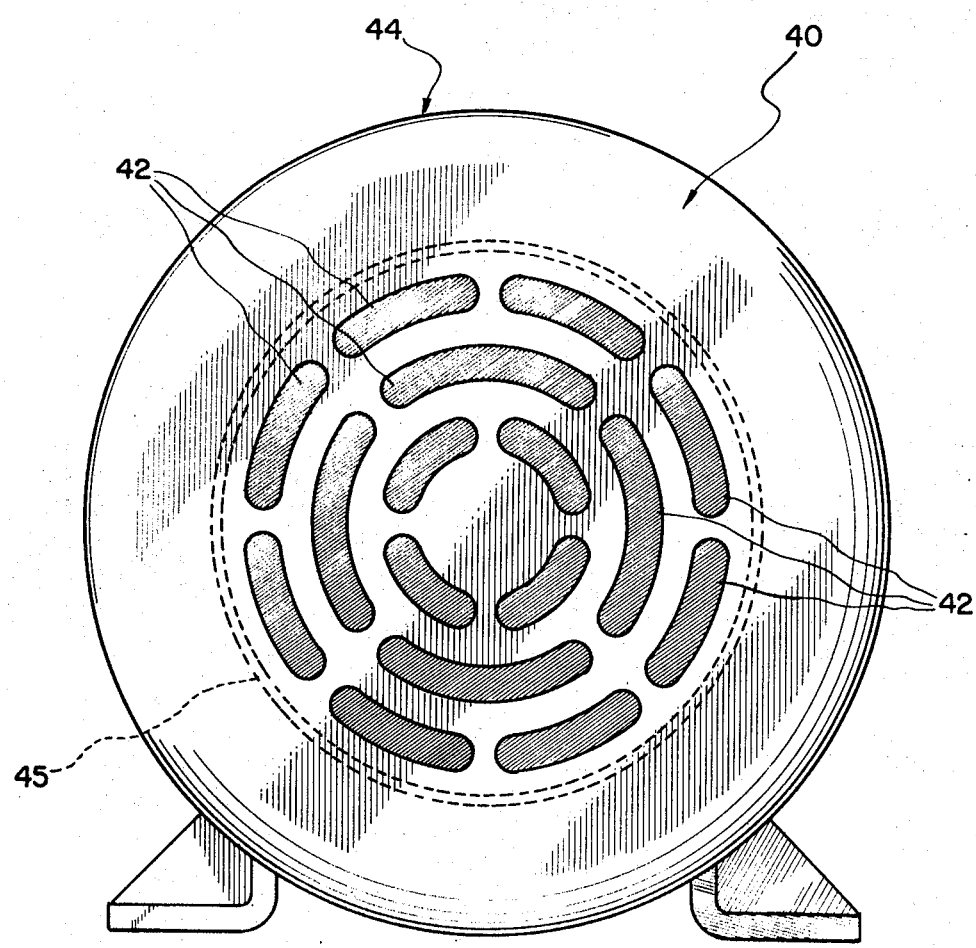
Figure 3:
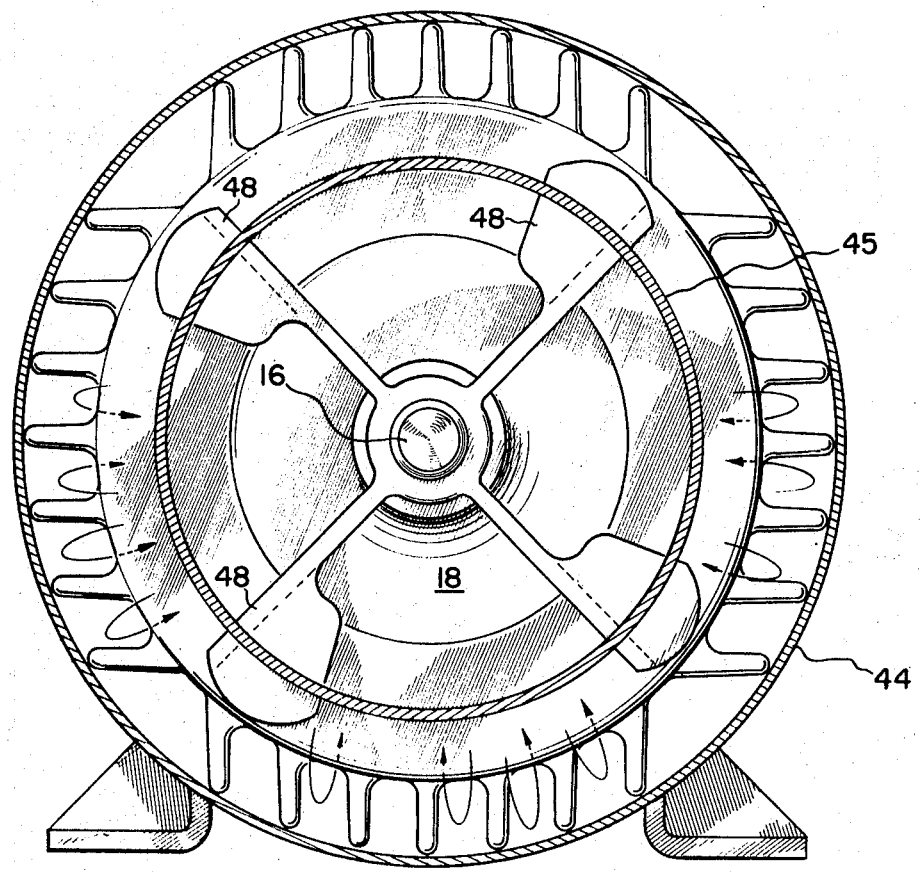

As can be seen from the fan cover of FIG. 2, air flowing into the opposite drive end of the motor is drawn through a plurality of apertures 42 approximately centrally disposed along the face of the fan cover remote from the motor. The air then is impelled radially outward toward cylindrically shaped wall 44 abutting against the outer periphery of end shield 18 to be directed into end turn cavity 19 through orifices 27 in the end shield. Because end shield 18, illustrated in FIG. 3, is a conventional dripproof end shield inhibiting entry of water falling at an angle of less than 15° from vertical, the only orifices 27 through end turn cavity 19 are located along the sides and bottom of the end shield.

Although the entire air stream entering fan enclosure 40 is illustrated in FIG. 1 as passing through end turn cavity 19 before passing axially along the motor frame, small quantities of air flowing into the fan enclosure also can be diverted from the end turn cavity to flow directly down the finned stator frame by providing apertures (not shown) through end shield 18 in radial registration with stator fins 21. The number and the size of the apertures, however, should be such that a majority, and preferably in excess of 70 percent by volume, of the air flow into fan enclosure 40 passes through the end turn cavity adjacent the fan enclosure.

In operation, current is fed to stator windings 11 of FIG. 1 causing rotation of the rotor 13 by means of the magnetic flux forces thus created. This process also produces electrical and magnetic heating within the stator which is conducted to cooling fins 21 for transfer to air passing between the fins. In accordance with this invention, electrical heating of end turns 14 is counteracted by means of the convective heat transfer to the air directed thereacross. At the opposite drive end of the motor, large quantities of cooling air are drawn into fan space 41 through apertures 42 by the rotation of fan 46 and the air is directed by fan enclosure walls 44 out of the fan space into end turn cavity 19 through orifices 27 situated along the sides and bottom of the dripproof end shield. The air then is directed by baffle 23 toward the radial center to the rotor and into cooperation with rotor fan blades 22 whereat the velocity of the air is enhanced by the rotor fan blades prior to flowing across the radially inner surface of end turns 14. Subsequently, the air exits through exhaust opening 28 to flow axially between cooling fins 21 to accept heat from the stator frame.

At the drive end of the motor depicted in FIG. 1, the direction of the air flow through end turn cavity 19' is substantially the same as air flow in end turn cavity 19; however, the volume of the air flow in end turn cavity 19' is reduced by the absence of the auxiliary fan and fan enclosure.

As stated hereinbefore, in addition to enhancing the air flow through the end turn cavity of dripproof motors, the auxiliary fan of the present invention is alternatively applicable to cool by convection the external surfaces of totally enclosed motors. It can thus be seen that this interchangeability substantially reduces the requirement for a large parts inventory to be kept for the application of auxiliary fans to closed and open motors. Additionally, while the present embodiment has disclosed enlarged rotor fan blades 22a at the drive end of the machine, it may be seen that the application of the present invention does not always require these enlarged blades; and the nominal rotor diameter rectangular blades 22 may be used at both ends of the machine further reducing parts inventory.

It is to be noted that the present invention has been described as applied to squirrel cage induction motors. The concepts of the invention, however, are equally applicable to any dynamoelectric machine. It is therefore intended that the appended claims shall cover all such modifications as do not depart from the true scope of the invention.

What is claimed as new and desired to be secured by Letters Patent of the United States is:

1. A dynamoelectric machine comprising; a stator having a stator winding including winding end turns extending from opposite ends of the stator, a rotor rotatably mounted within the stator, a stator frame circumferentially disposed about said stator, end shields disposed proximate each end of the stator to define end turn cavities respectively between the stator ends and said shields, each of said end shields having non-symmetrical intake orifices therein for admitting air to the end turn cavity associated therewith and defining with said frame an exhaust opening radially outward from said stator for passing air out of said cavity axially along the outer periphery of the stator frame, first fan means comprising two sets of rotor mounted fan blades (22 and 22a), each said set of fan blades being disposed respectively within one of said end turn cavities for moving air therein, a fan enclosure disposed in a position axially spaced outward from at least one end shield and, together with said one end shield, defining a fan space, said fan enclosure having an aperture for passing air therethrough into said fan space, and said fan enclosure further having wall means for directing at least a majority of said air out of said fan space and into the end turn cavity associated therewith through said orifices in said end shield, and second fan means disposed within said fan space for moving said air through said aperture into said fan space and thence into cooperation with said air directing means and said first fan means.

2. The dynamoelectric machine of claim 1 in which said first fan means includes a plurality of nominal rotor diameter fan blades mounted at one end of said rotor and a plurality of enlarged rotor fan blades mounted on the other end of said rotor, said enlarged fan blades being formed to extend axially into their associated end turn cavity (19') and to also extend radially outward to overlie the ends of the stator end turns adjacent thereto, and wherein said second fan means includes a radial fan mounted upon the shaft of said rotor outboard from the rotor diameter fan blades of the first fan means.

3. A dynamoelectric machine according to claim 1 wherein the entire air streams passing through said orifices are passed respectively into the end turn cavities before being directed toward one another along the outer surface of the frame of the machine.

* * * * *